(12) United States Patent
Diril et al.

(10) Patent No.: US 8,416,241 B2
(45) Date of Patent: *Apr. 9, 2013

(54) EFFICIENT TILE-BASED RASTERIZATION

(75) Inventors: Abdulkadir Utku Diril, San Jose, CA (US); Frido Garritsen, Hayward, CA (US)

(73) Assignee: Vivante Corporation, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/188,359

(22) Filed: Jul. 21, 2011

(65) Prior Publication Data

US 2012/0044245 A1 Feb. 23, 2012

Related U.S. Application Data

(63) Continuation of application No. 11/938,215, filed on Nov. 9, 2007, now Pat. No. 8,009,169.

(51) Int. Cl.
*G06T 15/10* (2011.01)
(52) U.S. Cl. ........ 345/427; 345/419; 345/421; 345/422; 345/428; 345/441
(58) Field of Classification Search ............ 345/419, 345/421, 422, 424, 426, 427, 428, 581, 629, 345/441
See application file for complete search history.

(56) References Cited

U.S. PATENT DOCUMENTS

| 5,544,294 | A | 8/1996 | Cho |
|---|---|---|---|
| 6,072,505 | A | 6/2000 | Piazza et al. |
| 6,285,376 | B1 | 9/2001 | Choi et al. |
| 6,421,053 | B1 | 7/2002 | Johns et al. |
| 6,556,203 | B1 | 4/2003 | Nelson |
| 6,611,272 | B1 | 8/2003 | Hussain et al. |
| 6,636,218 | B1 | 10/2003 | Nelson |
| 6,753,860 | B2 | 6/2004 | Nelson |
| 6,765,576 | B2 | 7/2004 | Nelson |
| 6,803,916 | B2 | 10/2004 | Ramani et al. |
| 6,972,768 | B2 | 12/2005 | Hussain et al. |
| 7,023,444 | B2 | 4/2006 | Emberling et al. |
| 7,042,460 | B2 | 5/2006 | Hussain et al. |
| 7,843,468 | B2 | 11/2010 | Crow et al. |

*Primary Examiner* — Kimbinh T Nguyen
(74) *Attorney, Agent, or Firm* — David R. Stevens; Stevens Law Group (57) ABSTRACT

An apparatus and method for rasterizing a primitive in a graphics system is disclosed in one example of the invention as including scanning a first row of tiles, one tile at a time, starting from a first point and scanning in a first direction. Immediately after scanning the first row of tiles, the method includes moving from the first point to a second point in an orthogonal direction relative to the first row. Immediately after moving from the first point to the second point, the method includes scanning a second row of tiles, one tile at a time, starting from the second point and scanning in the first direction. By scanning rows in the same direction immediately prior to and after moving from one row to another, cache utilization is improved.

19 Claims, 12 Drawing Sheets

EFFICIENT TILE-BASED RASTERIZATION

RELATED APPLICATIONS

This application is a continuation to U.S. application Ser. No. 11/938,215 filed Nov. 9, 2007 now U.S. Pat. No. 8,009,169 and entitled Efficient Tile-Based Rasterization, which is hereby incorporated herein by reference in its entirety.

BACKGROUND

This invention relates to three-dimensional (3D) graphics systems and more particularly to apparatus and methods for improving the efficiency of tile-based rasterization.

Rasterization is the process of taking a primitive (e.g., a triangle, line, point, polygon, etc.), described in vector format, and converting it to a raster image made up of pixels or dots. This raster image may then be provided to an output device such as a visual display or printer. Rasterization is currently the most widely used technique for generating real-time 3D computer graphics. This is primarily due to its high speed compared to other rendering techniques. Rasterization techniques must normally provide immediate response to user input in real-time applications and provide frame rates of at least twenty frames per second.

Currently, scanline rasterization is one of the most commonly used rasterization techniques. In this technique, the rasterizer converts a primitive to pixels one horizontal row, or scanline, at a time. In particular, this technique involves rasterizing a primitive into a framebuffer by "filling" the polygon one horizontal line at a time. This is typically performed by calculating runs or "spans" of pixels formed by the intersection of a scanline with the edges of the primitive. This technique typically requires a great deal of redundant computation, since each edge is checked for intersections with each successive scanline. To make scanline rasterization more efficient, optimization techniques such as active edge lists or tables have been introduced to track primitive edges that intersect with a scanline. This method, while much more efficient, is more complicated and thus more difficult to optimize.

An alternative technique to scanline rasterization is tiled-based rasterization. In this technique, a primitive is rasterized one block of pixels (i.e., one tile) at a time rather than one scanline at a time. A block or tile of pixels may include, for example a 4-by-4 block of sixteen pixels. Starting with an initial tile, valid pixels are determined for the tile. Once this tile is complete, the next tile is evaluated. This rasterization technique typically walks in a linear fashion, one tile at a time, horizontally from one edge of a primitive to the opposite edge. Upon reaching an edge, the next row of tiles either up or down from the previous row of tiles will be scanned. Each row of tiles will typically be evaluated in the same direction and sequence as the previous row. Unfortunately, this method for evaluating rows of tiles is not as efficient as it could be because it does not utilize cache memory effectively. In particular, this method for evaluating tiles reduces cache hits and breaks the cache utilization more than is necessary.

In view of the foregoing, what are needed are apparatus and methods for improving the efficiency of tile-based rasterization. More specifically, apparatus and methods are needed to improve cache utilization and thereby increase the frequency of cache hits when performing tile-based rasterization. Further needed are improved apparatus and methods for evaluating pixels within each tile when performing tile-based rasterization, thereby eliminating or reducing wasted cycles. Such apparatus and methods are disclosed and claimed herein.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through use of the accompanying drawings, in which.

DETAILED DESCRIPTION

The invention has been developed in response to the present state of the art, and in particular, in response to the problems and needs in the art that have not yet been fully solved by currently available apparatus and methods. Accordingly, the invention has been developed to provide novel apparatus and methods to efficiently perform tile-based rasterization. The features and advantages of the invention will become more fully apparent from the following description and appended claims and their equivalents, and also any subsequent claims or amendments presented, or may be learned by practice of the invention as set forth hereinafter.

Consistent with the foregoing, a method for rasterizing a primitive in a graphics system is disclosed in a first example of the invention as including scanning a first row of tiles, one tile at a time, starting from a first point and scanning in a first direction. A tile is defined as including a block of multiple pixels. Immediately after scanning the first row of tiles, the method includes moving from the first point to a second point in an orthogonal direction relative to the first row. Immediately after moving from the first point to the second point, the method includes scanning a second row of tiles, one tile at a time, starting from the second point and scanning in the first direction. By scanning rows in the same direction immediately prior to and after moving from one row to another, the locality of successively scanned tiles is improved. This improves cache utilization and scanning efficiency.

In selected examples, the first direction is horizontal and the orthogonal direction is vertical. Accordingly, the first direction may be one of right and left and the orthogonal direction may be one of up and down. In other examples, the first direction is vertical and the orthogonal direction is horizontal. In this case, the first direction may be one of up and down and the orthogonal direction may be one of right and left. In certain examples, the first point is located near or at an edge of the primitive.

In another example in accordance with the invention, a method for rasterizing a primitive in a graphics system includes scanning a primitive, one row of tiles at a time. The tiles are made up of blocks of multiple pixels having corner pixels. The method further includes evaluating the leading corner pixels of each tile as scanning progresses along a row to determine if the leading corner pixels are valid. In the event the leading corner pixels are invalid, the method includes discontinuing scanning additional tiles in the row. By evaluating the leading corner pixels of each tile as scanning progresses along a row, it can be determined whether the next tile is likely to include any valid pixels (pixels which are part of the primitive). If no valid pixels exist, scanning the next tile is unnecessary and a waste of resources. Thus, the method may improve the efficiency of tile-based rasterization by reducing the need to scan invalid tiles.

In selected examples, scanning a primitive one row of tiles at a time includes progressing along rows in one of an up, down, right, and left direction across the primitive. Similarly, discontinuing the scanning of additional tiles in a row may include finishing scanning the current tile.

In another example in accordance with the invention, a method for rasterizing a primitive in a graphics system includes scanning a primitive, one row of tiles at a time. Each tile includes a block of multiple pixels divided into quadrants, with each quadrant including corner pixels. The method further includes evaluating, as scanning progresses along a row, the leading corner pixels of the trailing quadrants of each tile to determine if the leading corner pixels of the trailing quadrants are valid. This is performed prior to evaluating the leading quadrants. In the event the leading corner pixels of the trailing quadrants are invalid, the method may include omitting scanning of the leading quadrants. In this way, the method reduces or eliminates scanning of quadrants that contain no valid pixels, thereby improving efficiency.

It will be readily understood that the components of the invention, as generally described and illustrated in the Figures herein, may be arranged and designed in a wide variety of different configurations. Thus, the following more detailed description of the examples of the apparatus and methods of the invention, as represented in the Figures, is not intended to limit the scope of the invention, as claimed, but is merely representative of selected examples of apparatus and methods that embody or otherwise incorporate the invention.

Some of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one example," "an example," or similar language means that a particular feature, structure, or characteristic described in connection with the example may be included in at least one example of the invention. Thus, use of the phrases "in one example" or "in an example" in various places throughout this specification are not necessarily all referring to the same example.

Furthermore, the described features, structures, or characteristics may be combined in any suitable manner in one or more examples. In the following description, specific details may be provided, such as examples of programming, software modules, or the like, to provide a thorough understanding of examples of the invention. One skilled in the relevant art will recognize, however, that the invention can be practiced without one or more of the specific details, or with other methods or components. In other instances, well-known structures, or operations are not shown or described in detail to avoid obscuring aspects of the invention.

The illustrated examples of the invention will be best understood by reference to the drawings, wherein like parts are designated by like numerals throughout. The following description is intended only by way of example, and simply illustrates certain selected examples of apparatus and methods that are consistent with the invention as claimed herein.

Figure 1:
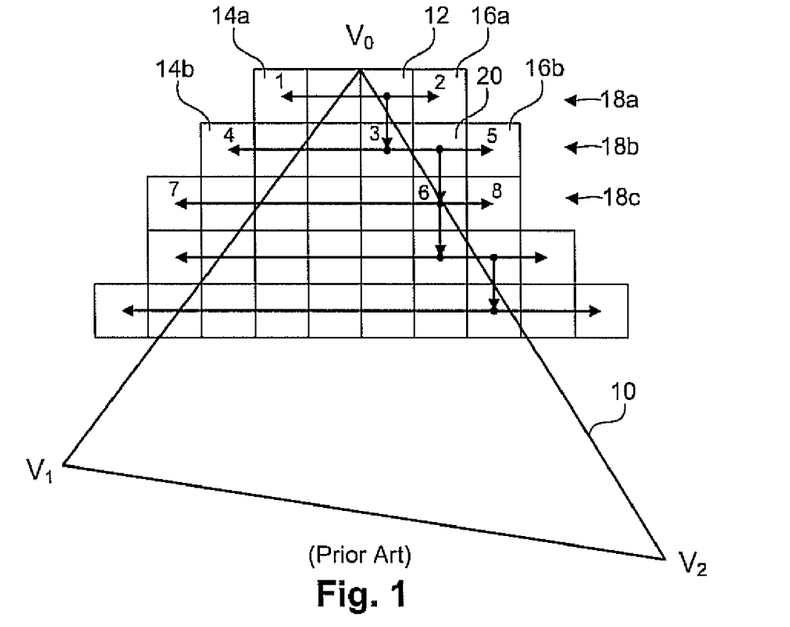
FIG. 1 is a diagram showing one prior art method for walking a primitive when performing tiled-based rasterization.

Referring to FIG. 1, in general, a prior art method for performing tile-based rasterization of a primitive 10 may include walking across the primitive 10 in a tiled fashion. For the purposes of this specification, a tile is defined as a block of pixels, typically an n×n block of pixels. For example, a prior art rasterization method may start with an initial tile 12 and then scan a row 18a, starting from the initial tile 12, in a first direction 1, until the row encounters an invalid tile 14a. For the purposes of this specification, an invalid tile is defined as one without any valid pixels (pixels within or belonging to the primitive 10). The prior art method may then scan from the initial tile 12 in the opposite direction 2 until reaching an invalid tile 16a, thereby finishing the scanning of the row 18a. The process may then proceed to the next row 18b by proceeding from the first tile 12 in a direction 3.

The scanning sequence used for the first row 18a may then be repeated for the second row 18b. That is, scanning may proceed from in a direction 4 (parallel to direction 1) until encountering an invalid tile 14b. Scanning may then proceed in a direction 5 until encountering an invalid tile 16b, finishing the scanning of the row 18b. The process may then proceed to the next row 18c by proceeding from a tile 20, such as the last valid tile 20 along the primitive edge, to the next row 18c. This process will continue for each row of tiles in the primitive until the entire primitive 10 is scanned and rasterized.

One notable characteristic of the prior art tile-based scanning technique illustrated in FIG. 1 is that each row is scanned in the same order and direction as the previous row. That is, a row may be scanned starting from some point in a left direction, and then from the same point in the right direction. Although effective, this scanning method does not utilize the cache effectively. In particular, this scanning technique breaks the cache utilization more than is necessary, causing more cache misses than are necessary.

Figure 2:
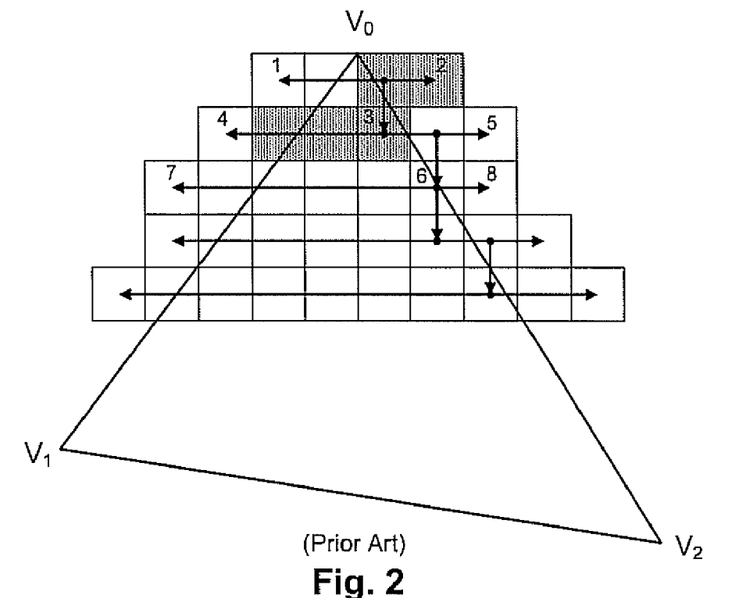
FIG. 2 is a diagram showing the locality of successively scanned tiles in the tile-based rasterization walking pattern of FIG. 1.

For example, as shown in FIG. 2, the grey tiles represent tiles that are scanned in succession using the technique described in FIG. 1. As shown, the tiles are spread out and not grouped as closely as they could be. The more the tiles are spread out, the less likely the tiles are to share common textures or other attributes. It follows that more closely grouped tiles are more like to share common textures or other attributes. When the tiles are spread out, cache misses may increase, causing inefficient utilization of the cache.

Figure 3:
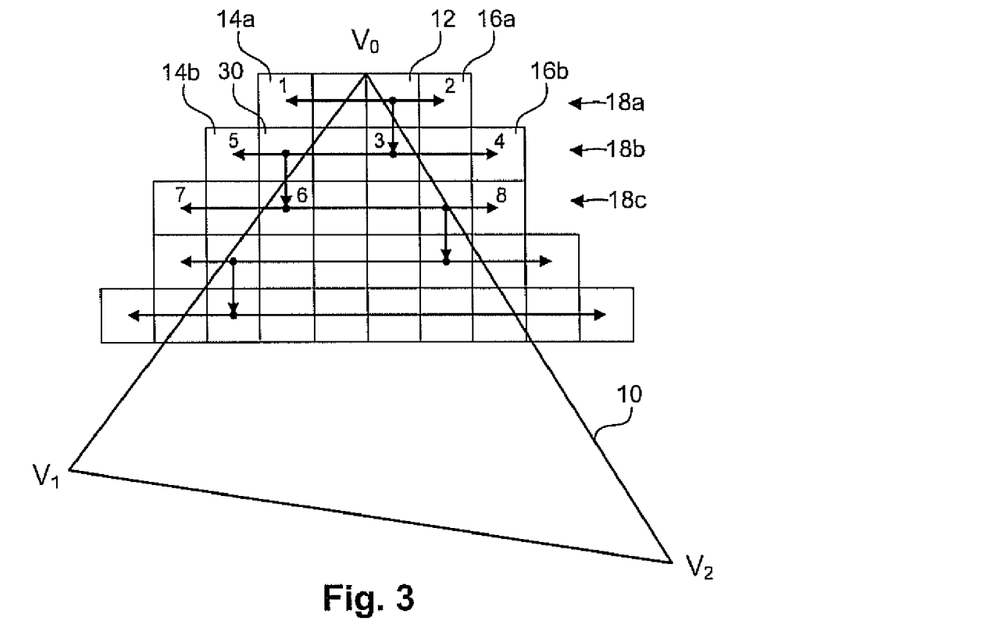
FIG. 3 is a diagram showing one example of an improved method for walking a primitive when performing tiled-based rasterization.

Referring to FIG. 3, an improved tile-based scanning technique may be used to improve cache utilization and increase the cache hit frequency. In selected examples in accordance with the invention, an improved tile-based rasterization technique may include walking across the primitive 10 in a tiled fashion. In particular, this technique may start with an initial tile 12 and then scan a row 18a of tiles, starting from the initial tile 12, in a first direction 1, until encountering an invalid tile 14a. The method may then scan from the initial tile 12 in the opposite direction 2 until reaching an invalid tile 16a, finishing scanning of the row 18a. The process may then proceed to the next row 18b by proceeding from the first tile 12 in a direction 3.

At this point, the improved scanning process differs in an important way from the prior art process illustrated in FIG. 1. Instead of scanning in a direction parallel to the direction 1, scanning may proceed in the opposite direction 4, parallel to the direction 2, until encountering an invalid tile 16b. Scanning may then proceed in a direction 5 until encountering an invalid tile 14b, finishing the scanning of the row 18b. The process may then proceed to the next row 18c by proceeding from a tile 30, such as the last valid tile 30 along the primitive edge, to the next row 18c. The above-described process may then continue for each row of tiles in the primitive until the entire primitive 10 is scanned and rasterized.

Figure 4:
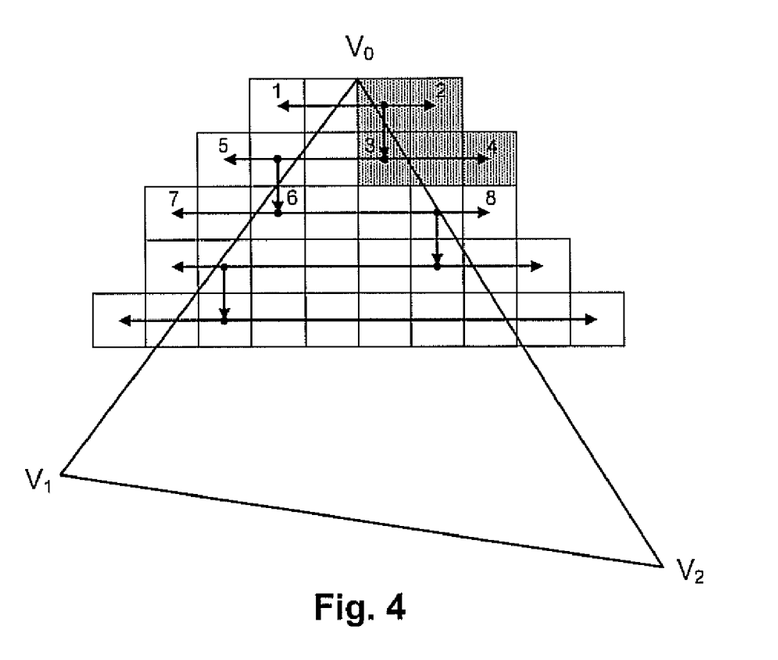
FIG. 4 is a diagram showing the locality of successively scanned tiles in the improved tile-based rasterization walking pattern of FIG. 3.

One of the significant differences between the technique described in FIG. 3 and that described in FIG. 1 is that rows are scanned in the same direction immediately prior to and after moving from one row to another. This improves the locality of successively scanned tiles, and improves cache utilization and scanning efficiency. For example, as shown in FIG. 4, the grey tiles represent tiles that are scanned in succession using the technique described in FIG. 3. As shown, the tiles are grouped more closely than the tiles illustrated in FIG. 2 due to the change in scanning direction. These tiles are more likely to share common textures or other attributes. This close grouping will increase cache hits and thereby improve cache utilization.

Figure 5:
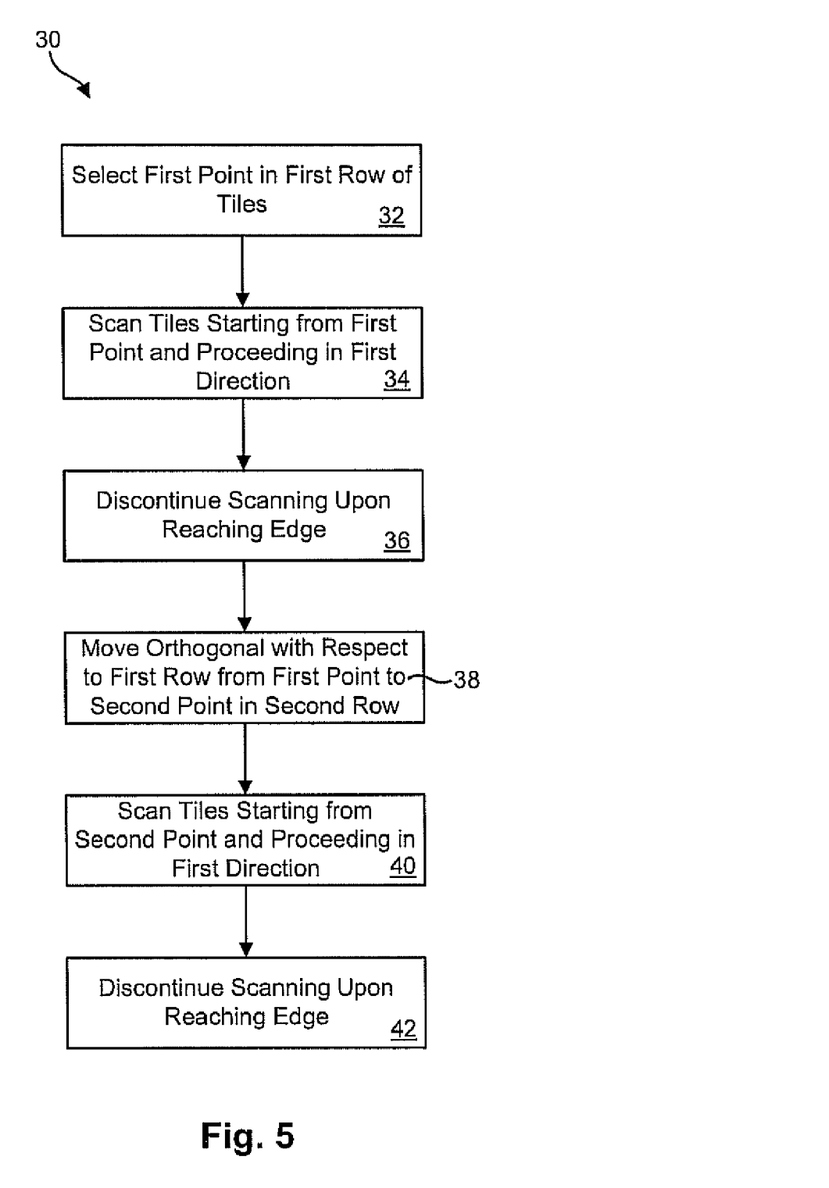
FIG. 5 is a flow chart showing one example of an improved method for walking a primitive when performing tiled-based rasterization.

Referring to FIG. 5, in selected examples, a method 30 for rasterizing a primitive using the technique described in FIGS. 3 and 4 may include selecting 32 a first point in a first row of tiles. Tiles may then be scanned 34 starting from the first point and proceeding in a first direction. The first direction may include, for example, a horizontal direction if the row is horizontal or a vertical direction if the row is vertical. Scanning may continue in a tiled fashion until reaching an edge of the primitive, at which point scanning may be discontinued 36. This may include, for example, discontinuing scanning upon encountering a tile with all invalid pixels or encountering the last tile in the row with valid pixels, as will be explained in FIGS. 6 and 7.

Once the edge of the primitive is reached, the method 30 may move 38 orthogonal with respect to the first row, from the first point, to a second point in a second row. Tiles may then be scanned 40 starting from the second point and proceeding in the first direction. Scanning may continue in a tiled fashion until reaching an edge of the primitive, at which point scanning may be discontinued 42. Because the first and second rows are scanned in the same direction (the "first direction") immediately prior to and after moving from the first row to the second row, scanning locality and cache utilization are improved. The method 30 illustrated in FIG. 5 focuses on an improved technique for performing tile-based rasterization which may be implemented by itself or be incorporated into a larger more comprehensive method for performing tile-based rasterization.

Figure 6:
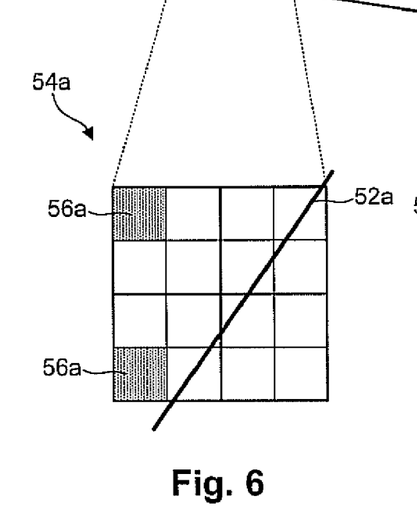
FIG. 6 is a diagram showing one example of an improved technique for evaluating tiles when moving in a leftward direction.
Figure 7:
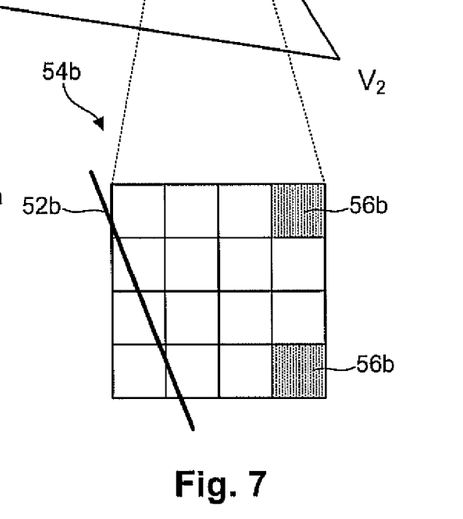
FIG. 7 is a diagram showing one example of an improved technique for evaluating tiles when moving in a rightward direction.

Referring to FIGS. 6 and 7, as mentioned, when scanning a row of tiles, scanning may proceed in a tiled fashion until reaching an edge of the primitive, at which point scanning may be discontinued. FIGS. 6 and 7 show tiled-based scanning proceeding in a leftward and rightward direction, respectively, although the same principles may be applied to scanning in an upward or downward direction. In general, conventional tile-based scanning may proceed along a row until an invalid tile (a tile without valid pixels) is encountered. Although effective, this method may be inefficient because it evaluates tiles lacking valid pixels. This wastes cycles and slows down the rasterization process.

In selected examples in accordance with the invention, an improved technique for evaluating tiles may include scanning a primitive 50, one row of tiles at a time, moving from an interior of the primitive 50 toward an edge 52a, 52b of the primitive 50. As scanning progresses toward an edge 52a, 52b, the leading corner pixels 56a, 56b of each tile 54a, 54b may be checked to determine if they are valid. For the purposes of this specification, the leading corner pixels 56a, 56b are defined as pixels at the corners of the tiles 54a, 54b on the leading edge of the tiles 54a, 54b as determined by the scanning direction.

If the leading corner pixels are invalid, it may be assumed that the tile to the left of the tile 54a (in the case of FIG. 6), or to the right of the tile 54b (in the case of FIG. 7), is completely invalid (having no valid pixels). This is because the edge 52a, 52b likely passes through the tile 54a, 54b behind the leading corner pixels 56a, 56b and thus will not intersect the next adjacent tile. If the leading corner pixels 56a, 56b are invalid, scanning the next tile may be unnecessary. Thus, scanning the row may be discontinued without checking the next tile. This technique saves cycles that may otherwise be wasted scanning invalid tiles in conventional tile-based rasterization techniques, significantly increasing rasterization efficiency.

On the other hand, if one or more of the leading corner pixels 56a, 56b are valid, there is a high likelihood that the next adjacent tile will also include valid pixels. In this case, the next tile may be checked for valid pixels. The leading corner pixels 56a, 56b of this tile may also be checked to determine if the next tile should be scanned for valid pixels, and so forth.

Figure 8:
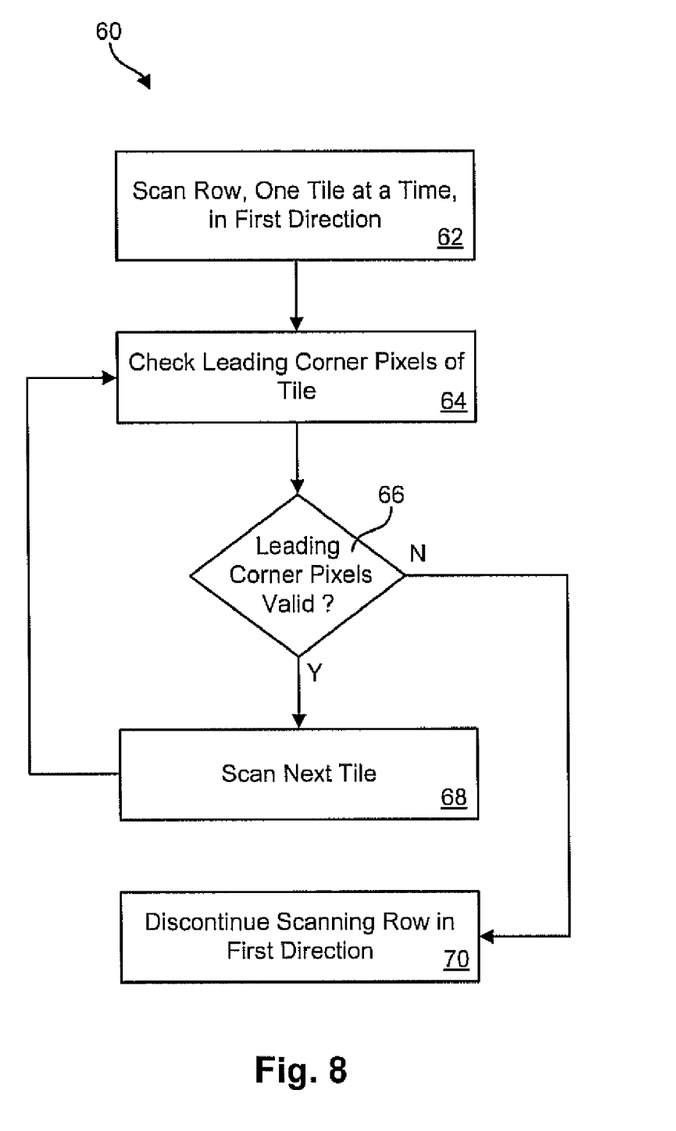
FIG. 8 is a flow chart showing one example of an improved method for evaluating tiles in a row as described in FIGS. 6 and 7.

Referring to FIG. 8, in selected examples, a method 60 for rasterizing a primitive using the technique described in FIGS. 6 and 7 may include scanning 62 a row of a primitive, one tile at a time, in a first direction. The leading corner pixels of each tile may be checked 64 as scanning progresses along the row to determine if the leading corner pixels are valid. A test 66 may then determine whether the leading corner pixels are valid. If the leading corner pixels are valid, the method may include scanning 68 the next tile in the row because it is likely to contain valid pixels. If the leading corner pixels are invalid, however, the method may include discontinuing scanning 70 the row because the next tile most likely does not contain valid pixels. The method 60 of FIG. 8 focuses on one method of reducing the number of invalid tiles that are scanned unnecessarily. This method 60 may be implemented by itself or may be integrated into a more comprehensive and complete method for performing tile-based rasterization.

Figure 9:
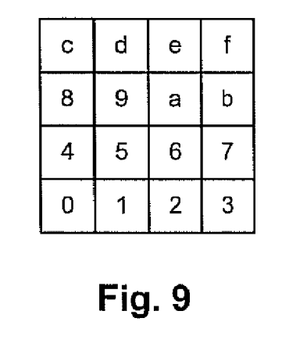
FIG. 9 is a block diagram showing a pixel numbering convention used in the present disclosure.
Figure 10:
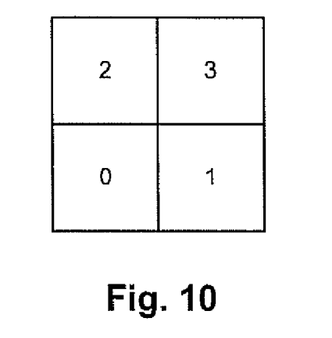
FIG. 10 is a block diagram showing a quadrant numbering convention used in the present disclosure.

Referring to FIGS. 9 and 10, in addition to reducing the number of tiles that are scanned unnecessarily, improved techniques in accordance with the invention may be used to scan the pixels within each tile. FIGS. 9 and 10 are provided to show pixel and quadrant numbering conventions used in the present disclosure to facilitate an understanding of FIGS. 11 through 21. In this example, the tile illustrated in FIGS. 9 and 10 is a 4×4 block of sixteen pixels (FIG. 9) which may be divided into four quadrants (FIG. 10), each quadrant having four pixels. Nevertheless, the methods and techniques described in FIGS. 11 through 21 may be implemented with tiles of various dimensions, typically n×n blocks of pixels, divided into quadrants. In general, when evaluating a tile, each quadrant and the pixels contained therein are evaluated successively to maintain locality and improve cache performance.

Figure 11:
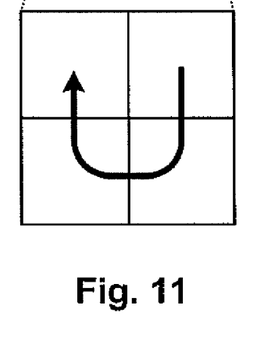
FIG. 11 is a diagram showing one example of an improved technique for walking and evaluating tile quadrants when moving in a leftward direction.

Referring to FIG. 11, as mentioned, when scanning a row of tiles, scanning may proceed in a tiled fashion until reaching an edge of a primitive 80. When evaluating a tile for valid pixels, the quadrants and pixels within each quadrant may be walked in a pre-determined order depending on the direction of travel and the tile that is being evaluated. This may optimize the evaluation of pixels within each tile and reduce or eliminate scanning of pixels which are invalid. Conventional scanning techniques tend to evaluate quadrants and pixels within each quadrant in the same order regardless of the direction of travel or the tile that is being evaluated.

For example, referring to FIG. 11, when scanning a row of tiles in a leftward direction, the quadrants may be scanned in a pre-determined order to ensure that valid pixels are evaluated first and that invalid pixels are evaluated last or not evaluated at all. For example, when moving in a leftward direction, a tile 82a may be evaluated starting with the trailing quadrants and finishing with the leading quadrants. In selected examples, the quadrants may be evaluated in a (3-1-0-2) order (See FIG. 10 for numbering conventions) when traveling in a leftward direction as indicated by the curved arrow. This order is used because the trailing quadrants are more likely to contain valid pixels than the leading quadrants. That is, as a tile 82a encounters an edge 84a, the leading quadrants are more likely to lie outside, or contain pixels that reside outside, the primitive 80. Thus, the trailing quadrants may be evaluated first to ensure that pixels that are more likely to be valid are processed first.

In selected examples, the designated order for evaluating quadrants may be used to eliminate or reduce the evaluation of invalid pixels. For example, referring again to FIG. 11, when evaluating the trailing quadrants (3 and 1), the leading corner pixels ('e' and 2) of these quadrants may be checked for valid pixels. If the leading corner pixels are invalid, there is a high likelihood that the leading quadrants will not contain valid pixels. Thus, evaluation of the leading quadrants (2 and 0) may be omitted to save cycles and increase efficiency. In this way, the designated order for walking the quadrants may be used beneficially to reduce or eliminate scanning of invalid quadrants within each tile.

Figure 12:
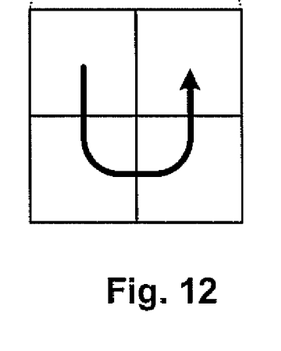
FIG. 12 is a diagram showing one example of an improved technique for walking and evaluating tile quadrants when moving in a rightward direction.

Referring to FIG. 12, similarly, when scanning a row of tiles in a rightward direction, the quadrants may be scanned in a different order to ensure that valid pixels are evaluated first and that invalid pixels are evaluated last or not evaluated at all. For example, when moving in a rightward direction, a tile 82b may be evaluated starting with the trailing quadrants and finishing with the leading quadrants in a (2-0-1-3) order as indicated by the curved arrow. Like the previous example, when evaluating the trailing quadrants (2 and 0), the corner pixels ('d' and 1) of these quadrants may be checked for valid pixels. If the corner pixels are invalid, the leading quadrants (3 and 1) are unlikely to contain valid pixels and evaluation of the leading quadrants may be omitted.

Figure 13:
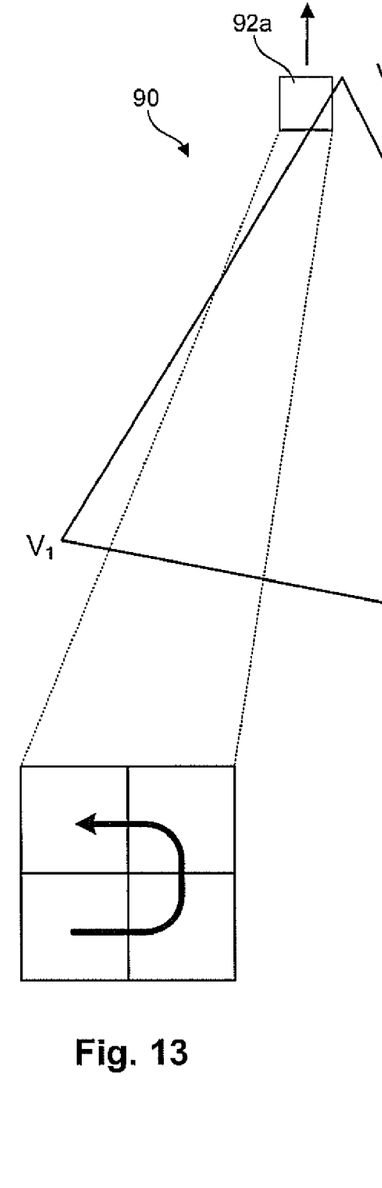
FIG. 13 is a diagram showing one example of an improved technique for walking and evaluating tile quadrants when moving in an upward direction.
Figure 14:
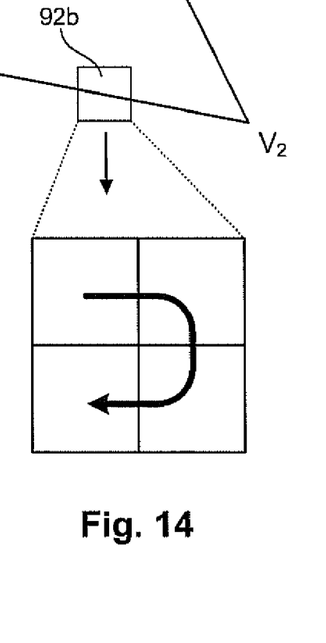
FIG. 14 is a diagram showing one example of an improved technique for walking and evaluating tile quadrants when moving in a downward direction.

Referring to FIGS. 13 and 14, similarly, the techniques discussed above in association with FIGS. 11 and 12 may be applied to scanning a primitive 90 in a tiled manner in an upward or downward direction. That is, tiles 92a, 92b, whether scanning in an upward or downward direction, may be evaluated starting with the trailing quadrants and finishing with the leading quadrants. Thus, the quadrants of the tile 92a may be evaluated in a (0-1-3-2) order when scanning in an upward direction, as illustrated in FIG. 13. Likewise, the quadrants of the tile 92b may be evaluated in a (2-3-1-0) order when scanning in a downward direction, as illustrated in FIG. 14.

Figure 15:
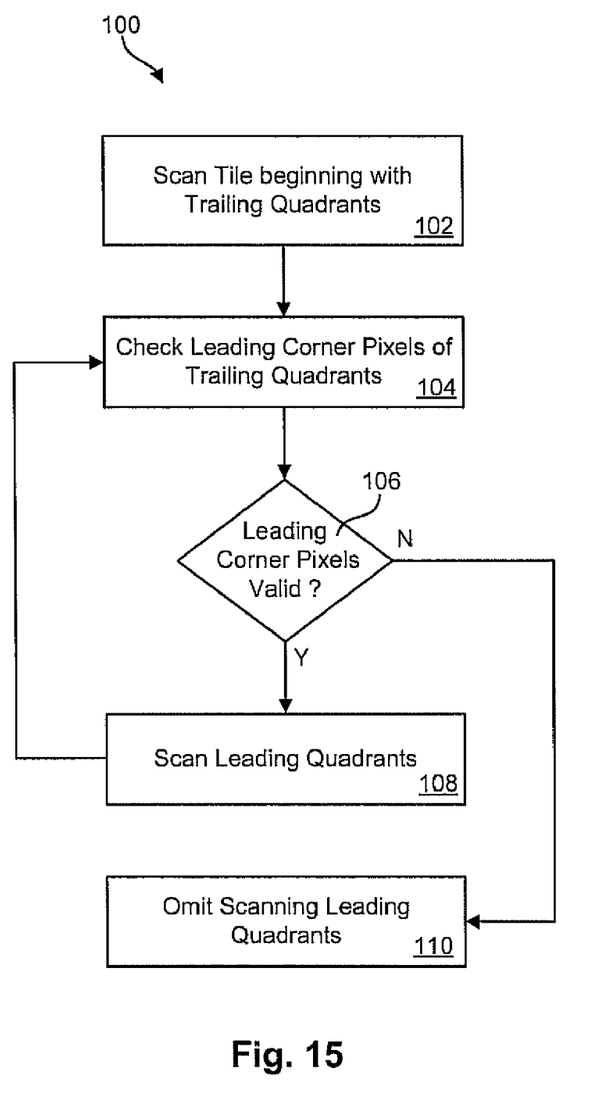
FIG. 15 is a flow chart showing one example of an improved method for walking and evaluating tile quadrants as described in FIGS. 11 through 14.

Referring to FIG. 15, in selected examples, a method 100 for rasterizing a primitive using the techniques described in FIGS. 11 through 14 may include scanning 102 a tile by first evaluating the trailing quadrants. The leading corner pixels of the trailing quadrants may be checked 104 to determine if they include valid pixels. If, at a decision step 106, the leading corner pixels are valid, the method 100 may include scanning 108 the leading quadrants since there is a high likelihood that the leading quadrants will include valid pixels. If, on the other hand, the leading corner pixels of the trailing quadrants are invalid, the method 100 may omit scanning 110 of the leading quadrants since there is a high likelihood that they will not include valid pixels. In this manner, the method 100 may omit scanning quadrants that are unlikely to contain valid pixels, increasing rasterization efficiency. Like the previous examples, the method 100 is not necessarily intended to describe a complete rasterization process, but may be integrated into a more comprehensive and complete method for performing tile-based rasterization.

Referring to FIGS. 16 through 19, in selected examples, a different order may be used to evaluate the quadrants of a first tile traveling in particular direction. For example, referring to FIG. 16, the quadrants of a first tile 120*a* when scanning in a rightward direction may be evaluated differently from the quadrants of other tiles traveling in a rightward direction (as shown in FIG. 12). In this example, the first tile 120*a* is more likely to include valid pixels in the leading quadrants (3 and 1) as opposed to the trailing quadrants (2 and 0). This is because the trailing quadrants of the first tile 120*a* may reside to the left of the primitive edge and thus reside outside the primitive.

Figure 16:
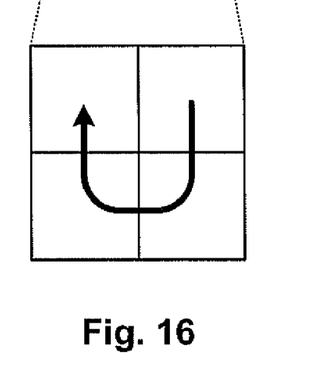
FIG. 16 is a diagram showing one example of an improved technique for walking and evaluating tile quadrants for a first tile moving in a rightward direction.

In this example, the quadrants of the tile may be evaluated in a (3-1-0-2) order, as indicated by the curved line. When evaluating the leading quadrants (3 and 1), the trailing corner pixels ('e' and 2) of these quadrants may be checked for valid pixels. If the trailing corner pixels of the leading quadrants are invalid, there is a high likelihood that the trailing quadrants will not contain valid pixels. This allows the evaluation of the trailing quadrants (2 and 0) to be omitted to reduce or eliminate scanning of invalid quadrants.

Figure 17:
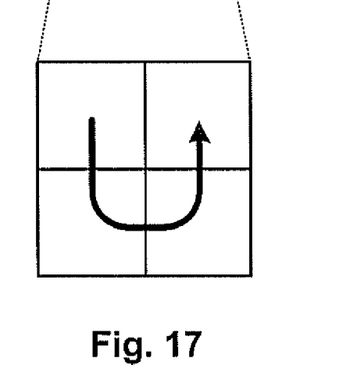
FIG. 17 is a diagram showing one example of an improved technique for walking and evaluating tile quadrants for a first tile moving in a leftward direction.
Figure 18:
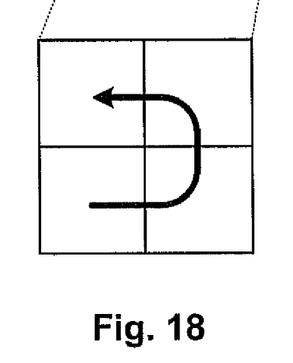
FIG. 18 is a diagram showing one example of an improved technique for walking and evaluating tile quadrants for a first tile moving in a downward direction.
Figure 19:
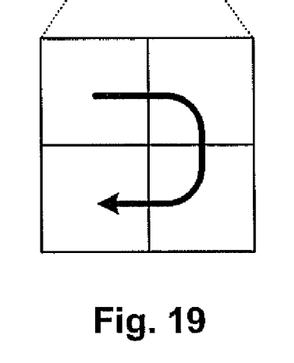
FIG. 19 is a diagram showing one example of an improved technique for walking and evaluating tile quadrants for a first tile moving in an upward direction.

Similarly, the first tile may be evaluated starting with the leading quadrants and finishing with the trailing quadrants where scanning in a leftward, downward, or upward direction, as shown in FIGS. 17 through 19. Thus, the quadrants of a tile 120*b* may be evaluated in a (2-0-1-3) order for the first tile scanning in a leftward direction, as illustrated in FIG. 17. Similarly, the quadrants of a tile 130*a* may be evaluated in a (0-1-3-2) order for the first tile scanning in a downward direction, as illustrated in FIG. 18. Similarly, the quadrants of a tile 130*b* may be evaluated in a (2-3-1-0) order for the first tile scanning in an upward direction, as illustrated in FIG. 19.

Figure 20:
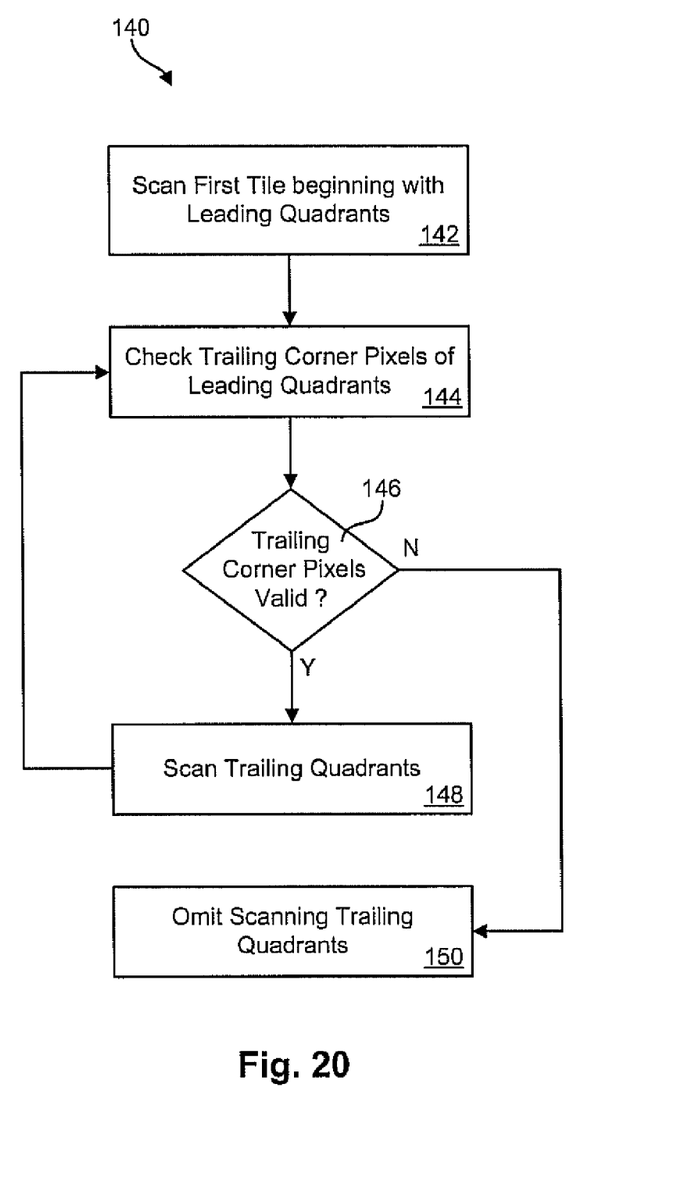
FIG. 20 is a flow chart showing one example of an improved method for walking and evaluating tile quadrants for a first tile, as described in FIGS. 16 through 19.

Referring to FIG. 20, in selected examples, a method 140 for rasterizing a primitive using the techniques described in FIGS. 16 through 19 may include scanning 142 the first tile in any direction beginning with evaluation of the leading quadrants. The trailing corner pixels of the leading quadrants may then be checked 144 to determine if they include valid pixels. If, at a decision step 146, the trailing corner pixels of the leading quadrants are valid, the method 140 may include scanning 148 the trailing quadrants since there is a high likelihood that the trailing quadrants will include valid pixels. If, on the other hand, the trailing corner pixels of the leading quadrants are invalid, the method 140 may include omitting scanning 150 of the trailing quadrants since there is a high likelihood that they will not include valid pixels. In this way, the method 140 may omit scanning quadrants that are unlikely to contain valid pixels to increase rasterization efficiency. Like the previous examples, the method 140 is not necessarily intended to describe a complete rasterization process, but may be integrated into a more comprehensive and complete method for performing tile-based rasterization.

Figure 21:
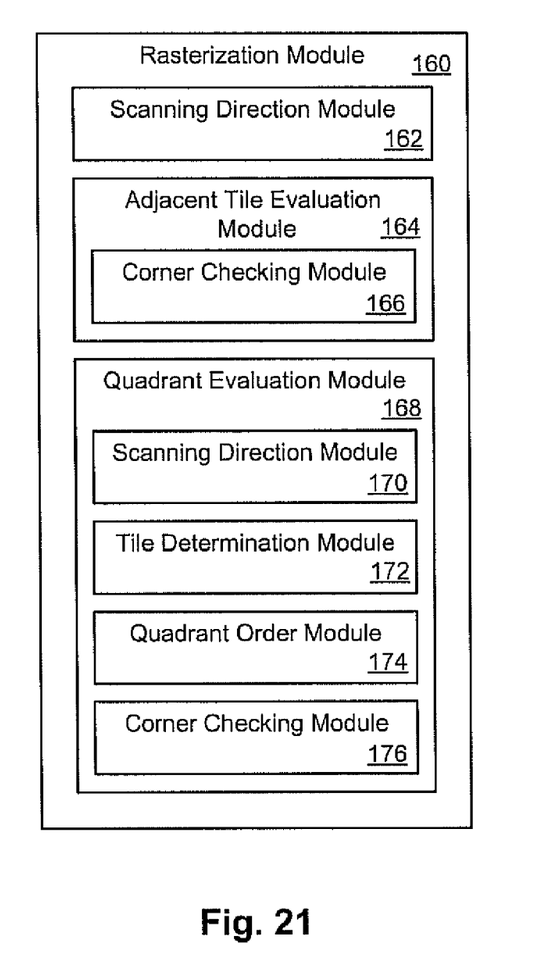
FIG. 21 is a high-level schematic block diagram showing various modules that may be used to implement several of the improved methods described herein.

Referring to FIG. 21, in selected examples, an apparatus in accordance with the invention may include a rasterization module 160 embodied in hardware, software, firmware, or combinations thereof, to implement one or more of the methods and techniques described in FIGS. 3 through 20. These methods and techniques may be implemented by various modules within the rasterization module 160. The rasterization module 160 need not include all of the modules described here, but may include additional or fewer modules than those illustrated.

In selected examples, a rasterization module 160 in accordance with the invention may include a scanning direction module 162 to implement the method described in FIG. 5. In particular, the scanning direction module 162 may ensure that rows are scanned in the same direction immediately prior to and after moving from one row to another to improve cache utilization, as shown in FIGS. 3 through 5.

The rasterization module 160 may also include an adjacent tile evaluation module 164 to implement the method described in FIGS. 6 through 8. More specifically, the adjacent tile evaluation module 164 may check the leading corner pixels of each tile as scanning progresses along a row to determine if the next tile includes valid pixels. If the next tile does not include valid pixels, scanning of the next tile may be omitted to conserve cycles and improve rasterization efficiency. To perform this task, the adjacent tile evaluation module 164 may include a corner checking module 166 to check the leading corners of each tile as scanning progresses along a row.

The rasterization module 160 may also include a quadrant evaluation module 168 to implement the methods and techniques described in FIGS. 11 through 20. More specifically, the quadrant evaluation module 168 may determine the proper order for scanning the quadrants of a tile based on the scanning direction (e.g., leftward, rightward, upward, or downward) and which tile is being scanned (i.e., whether the tile is the first tile being scanned in a particular direction). To perform these tasks, the quadrant evaluation module 168 may include a scanning direction module 170 to determine the scanning direction and a tile determination module 172 to determine whether the tile is the first tile being scanned in a particular direction.

The quadrant evaluation module 168 may also include a quadrant order module 174 to designate the quadrant scanning order (e.g., (0-1-3-2), (2-3-1-0), etc.) based on the scanning direction and the tile that is being scanned. The quadrant evaluation module 168 may also include a corner checking module 176 to check corner pixels of the initial quadrants being scanned to determine if the remaining quadrants include valid pixels and therefore also need to be scanned.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for rasterizing a primitive in a graphics system, the method comprising;
scanning, by the graphics system, a first row of tiles, one tile at a time, starting from a first point and scanning in a first direction, wherein a tile comprises a block of pixels;

moving, by the graphics system, immediately after scanning the first row of tiles, from the first point to a second point in an orthogonal direction relative to the first row; and scanning, by the graphics system, immediately after moving from the first point to the second point, a second row of tiles, one tile at a time, starting from the second point and scanning in the first direction.

2. The method of claim 1, wherein the first direction is horizontal and the orthogonal direction is vertical.

3. The method of claim 2, wherein the first direction is one of right and left.

4. The method of claim 2, wherein the orthogonal direction is one of up and down.

5. The method of claim 1, wherein the first direction is vertical and the orthogonal direction is horizontal.

6. The method of claim 5, wherein the first direction is one of up and down.

7. The method of claim 5, wherein the orthogonal direction is one of right and left.

8. The method of claim 1, wherein the first point is located near an edge of the primitive.

9. The method of claim 1, wherein the first point is located on an edge of the primitive.

10. A method for rasterizing a primitive in a graphics system, the method comprising:

scanning, by the graphics system, a primitive, one row of tiles at a time, wherein the tiles comprise blocks of multiple pixels having corner pixels;

evaluating, by the graphics system, the leading corner pixels of each tile as scanning progresses along a row to determine if the leading corner pixels are valid; and discontinuing, by the graphics system, scanning additional tiles in a row in the event the leading corner pixels are invalid.

11. The method of claim 10, wherein scanning a primitive one row of tiles at a time comprises progressing in one of an up, down, right, and left direction across the primitive.

12. The method of claim 10, wherein discontinuing scanning additional tiles in a row comprises finishing scanning a current tile.

13. The method of claim 10, wherein the leading corner pixels are invalid when they lie outside the primitive.

14. The method of claim 10, wherein the block of multiple pixels comprises an n×n block of multiple pixels.

15. A method for rasterizing a primitive in a graphics system, the method comprising:

scanning, by the graphics system, a primitive, one row of tiles at a time, wherein each tile comprises a block of multiple pixels divided into quadrants, each quadrant comprising corner pixels;

evaluating, by the graphics system, as scanning progresses along a row, the leading corner pixels of the trailing quadrants of each tile prior to evaluating the leading quadrants to determine if the leading corner pixels of the trailing quadrants are valid; and omitting, by the graphics system, scanning of the leading quadrants in the event the leading corner pixels of the trailing quadrants are invalid.

16. The method of claim 15, wherein scanning a primitive one row of tiles at a time comprises progressing in one of an up, down, right, and left direction across the primitive.

17. The method of claim 15, wherein omitting scanning of the leading quadrants comprises finishing scanning the trailing quadrants.

18. The method of claim 15, wherein the leading corner pixels of the trailing quadrants are invalid when they lie outside the primitive.

19. The method of claim 15, wherein the block of multiple pixels comprises an n×n block of multiple pixels.

\* \* \* \* \*